United States Patent
Sheng et al.

(10) Patent No.: US 10,321,181 B2
(45) Date of Patent: Jun. 11, 2019

(54) CONDITIONAL ACCESS METHOD AND SYSTEM FOR INTELLIGENT OPERATING SYSTEM

(71) Applicants: Academy of Broadcasting Science, State Administration of Press, Publication, Radio, Film & Television, Beijing (CN); BEIJING NOVEL-SUPER DIGITAL TV TECHNOLOGY CO., LTD, Beijing (CN)

(72) Inventors: Zhifan Sheng, Beijing (CN); Qiang Wang, Beijing (CN); Jing Zhang, Beijing (CN); Zheng Li, Beijing (CN); Lei Wang, Beijing (CN); Zhijian Liang, Beijing (CN); Xiaoxia Guo, Beijing (CN); Dongfei Wang, Beijing (CN)

(73) Assignees: BEIJING NOVEL-SUPER DIGITAL TV TECHNOLOGY CO., LTD, Beijing (CN); ACADEMY OF BROADCASTING SCIENCE, STATE ADMINISTRATION OF PRESS, PUBLICATION, RADIO, FILM & TELEVISION, Beijing (CN)

( * ) Notice: Subject to any disclaimer, the term of this patent is extended or adjusted under 35 U.S.C. 154(b) by 0 days.

(21) Appl. No.: 15/781,142

(22) PCT Filed: Dec. 1, 2016

(86) PCT No.: PCT/CN2016/108261
§ 371 (c)(1),
(2) Date: Jun. 3, 2018

(87) PCT Pub. No.: WO2017/092699
PCT Pub. Date: Jun. 8, 2017

(65) Prior Publication Data
US 2018/0352281 A1 Dec. 6, 2018

(30) Foreign Application Priority Data

Dec. 3, 2015 (CN) .......................... 2015 1 0884736

(51) Int. Cl.
*H04N 21/418* (2011.01)
*H04N 21/4623* (2011.01)
(Continued)

(52) U.S. Cl.
CPC ..... *H04N 21/4181* (2013.01); *H04N 21/2347* (2013.01); *H04N 21/2351* (2013.01);
(Continued)

(58) Field of Classification Search
CPC ......... H04N 21/26606; H04N 21/4623; H04N 21/26609; H04N 21/266; H04N 21/418;
(Continued)

(56) References Cited

U.S. PATENT DOCUMENTS

2007/0265978 A1* 11/2007 Kahn ..................... G06Q 30/04
705/59

* cited by examiner

*Primary Examiner* — Pankaj Kumar
*Assistant Examiner* — Franklin S Andramuno
(74) *Attorney, Agent, or Firm* — Rimon PC

(57) ABSTRACT

The present invention provides a conditional access method for an intelligent operating system that comprises a trusted execution environment. A digital TV module acquires all channel messages and a control management message. A media play module distributes a DescramblerId and sends the acquired videoPid, audioPid, casId, ecmPid and emmPid and the descrambler message DescramblerId to a conditional access module. The conditional access module selects a registered conditional access application module according to the casId. The conditional access application module acquires corresponding ecm Data and emm Data from the digital TV module, and sends the ecm Data and emm Data to the conditional access module. The conditional access (Continued)

module sends the messages to a trusted application module. The trusted application module performs parse to acquire EK1, EK2 and ECW. The security chip controls a descrambler corresponding to the DescramblerId to perform descrambling according to the acquired messages.

18 Claims, 3 Drawing Sheets

(51) Int. Cl.
    *H04N 21/266*     (2011.01)
    *H04N 21/4405*     (2011.01)
    *H04N 21/2347*     (2011.01)
    *H04N 21/235*     (2011.01)

(52) U.S. Cl.
    CPC ..... *H04N 21/266* (2013.01); *H04N 21/26606* (2013.01); *H04N 21/26609* (2013.01); *H04N 21/418* (2013.01); *H04N 21/4405* (2013.01); *H04N 21/44055* (2013.01); *H04N 21/4623* (2013.01)

(58) Field of Classification Search
    CPC ........... H04N 21/2347; H04N 21/2351; H04N 21/44055
    USPC ............................. 725/31, 146; 709/229, 237
    See application file for complete search history.

CONDITIONAL ACCESS METHOD AND SYSTEM FOR INTELLIGENT OPERATING SYSTEM

CROSS-REFERENCE TO RELATED APPLICATIONS

This application is a National Stage of International Application No. PCT/CN2016/108261, filed on Dec. 1, 2016, which claims priority to Chinese Patent Application No. 201510884736.4, filed on Dec. 3, 2015, both of which are hereby incorporated by reference in their entireties.

FIELD OF THE INVENTION

The present invention relates to the technical field of conditional access, and in particular to a conditional access method and system for an intelligent operating system.

BACKGROUND OF THE INVENTION

On Mar. 16, 2012, the State Administration of Press, Publication, Radio, Film and Television of China officially issued the industrial standard GY/T 255-2012 *Technical Specification of Downloadable Conditional Access System*. A downloadable conditional access system (DCAS) is a complete end-to-end business protection system, has all scrambling, descrambling and entitlement control and management functions of a traditional conditional access system (CAS), can simultaneously support two set-top boxes that employ a traditional conditional access technology and a DCAS technology respectively, and can also realize entitlement control and management of a terminal by two-way channels. By adoption of the DCAS technology, the digital TV set-top box can switch and adapt to different DCAS systems so long as client software of the different DCAS systems is downloaded. Thus, a solid foundation is laid for breaking the current situation that the set-top boxes are customized for wired networks, and realizing standard mass production, sales by nationwide retail-channels and cross-regional cross-network deployment of the set-top boxes.

However, with constant progress in integrating telecom, broadcasting and Internet networks and proposing of an objective of establishing the next generation broadcasting (NGB), realizing interconnection of the nationwide cable TV networks still needs to break through the limitations of the downloadable conditional access technology that is being implemented. Particularly, with development of the Internet TV, the TV operating system (TVOS) 1.0 with the characteristics of a high security level, excellent openness, a high integration level, etc. was released in 2013. Hence, during the process of transforming from a traditional digital TV to a smart TV, the conditional access technology needs to synchronously evolve from digitization to intelligence. An urgent problem to be solved at present is how to realize the DCAS technology in an intelligent operating system.

SUMMARY OF THE INVENTION

According to an aspect of the present invention, there is provided a conditional access method for an intelligent operating system. The conditional access method is implemented in a smart device. The smart device is equipped with the intelligent operating system and comprises a live broadcasting application module, a conditional access application module, a digital TV module, a media play module, a conditional access module, a trusted execution environment (TEE) and a high-security chip. The conditional access method comprises:

acquiring a channel program list and providing the acquired channel program list for the live broadcasting application module for display by means of the digital TV module;

sending a switched channel program identifier to the media play module by means of the live broadcasting application module in response to a channel change instruction or a program play instruction of a user;

acquiring all channel messages and a control management message by means of the digital TV module, wherein the channel messages comprise a channel program identifier and video stream identifier videoPid and audio stream identifier audioPid of all channels, and the control management message comprises a conditional access application identifier casId, an entitlement control message identifier ecmPid and an entitlement management message identifier emmPid;

acquiring a video stream identifier videoPid, an audio stream identifier audioPid, a conditional access application identifier casId, an entitlement control message identifier ecmPid and an entitlement management message identifier emmPid of a channel program from the digital TV module according to the acquired channel program identifier, distributing a descrambler message DescramblerId required to be used by the channel program and sending the video stream identifier videoPid, the audio stream identifier audioPid, the conditional access application identifier casId, the entitlement control message identifier ecmPid, the entitlement management message identifier emmPid and the descrambler message DescramblerId of a channel to the conditional access module, by means of the media play module;

selecting a conditional access application module that is registered in the intelligent operating system and matched with the conditional access application identifier casId according to the received conditional access application identifier casId and simultaneously sending the video stream identifier videoPid, the audio stream identifier audioPid, the entitlement control message identifier ecmPid, the entitlement management message identifier emmPid and the descrambler message DescramblerId of the channel to the conditional access application module, by means of the conditional access module;

acquiring corresponding entitlement control message data ecm Data and entitlement management message data emm Data from the digital TV module according to the acquired entitlement control message identifier ecmPid and entitlement management message identifier emmPid, and sending the acquired corresponding entitlement control message data ecm Data and entitlement management message data emm Data, as well as the video stream identifier videoPid, the audio stream identifier audioPid and the descrambler message DescramblerId of the channel, to the conditional access module, by means of the conditional access application module;

sending the entitlement control message data ecm Data and the entitlement management message data emm Data, as well as the video stream identifier videoPid, the audio stream identifier audioPid and the descrambler message DescramblerId of the channel, to a trusted application module in the trusted execution environment by means of the conditional access module;

performing parse according to a preset mechanism by means of the trusted application module in the trusted execution environment to acquire a descrambled entitlement message in the entitlement management message, wherein if the descrambled entitlement message represents entitlement permission, encryption level keys EK1 and EK2 and an encryption control word ECW are acquired and sent to the high-security chip together with the video stream identifier videoPid, the audio stream identifier audioPid and the descrambler message DescramblerId; and controlling a descrambler specified by the descrambler message DescramblerId to descramble scrambled channel program data according to the encryption level keys EK1 and EK2, the encryption control word ECW, the video stream identifier videoPid and the audio stream identifier audioPid and playing video stream data and audio stream data that are descrambled according to the video stream identifier videoPid and the audio stream identifier audioPid, by means of the high-security chip.

Preferably, the channel program identifier comprises an original network identifier onid, a transmission stream identifier tsid and a service identifier sid of the channel.

Preferably, the channel messages acquired in the step of acquiring all the channel messages and the control management message by means of the digital TV module comprise an identifier CAMode that indicates whether all the channels are scrambled channels or not.

After the step of acquiring all the channel messages and the control management message by means of the digital TV module, the conditional access method further comprises:

inquiring and acquiring the identifier CAMode that indicates whether the channel is a scrambled channel or not from the digital TV module according to the channel program identifier and judging whether the channel is the scrambled channel or not according to the identifier CAMode by means of the media play module;

if judging that the channel is not the scrambled channel in the judgement step, acquiring the video stream identifier videoPid and the audio stream identifier audioPid of the channel from the digital TV module by means of the media play module, and entering the play step; and if judging that the channel is the scrambled channel in the judgement step, acquiring the video stream identifier videoPid, the audio stream identifier audioPid, the conditional access application identifier casId, the entitlement control message ecmPid and the entitlement management message identifier emmPid of the channel from the digital TV module by means of the media play module.

Preferably, the digital TV module, the media play module and the conditional access module are component-layer components pre-disposed in the intelligent operating system.

Preferably, the digital TV module, the media play module and the conditional access module realize a client-service structure. An IPC calling mode is employed between a client and a service.

Preferably, the conditional access application module and the live broadcasting application module are applications that may be installed in or uninstalled from the intelligent operating system.

Preferably, a plurality of conditional access application modules is registered in the intelligent operating system and provided by different conditional access manufacturers.

Preferably, a plurality of trusted application modules is disposed in the trusted execution environment and provided by different conditional access manufacturers. The conditional access application module carries an identifier that indicates a trusted application module matched with the conditional access application module. A corresponding relationship between the conditional access application module and the trusted application module is established in the conditional access module when the conditional access application module is registered in the intelligent operating system, such that the conditional access module may send the entitlement control message data ecm Data and the entitlement management message data emm Data, as well as the video stream identifier videoPid, the audio stream identifier audioPid and the descrambler message DescramblerId of the channel, to the trusted application module matched with the conditional access application module.

Preferably, the trusted execution environment (TEE) comprises a hardware resource, a TEE internal API and a secure operating system that are isolated from the intelligent operating system.

According to another aspect of the present invention, there is provided a conditional access system for an intelligent operating system. The conditional access system is executed in a smart device. The smart device is equipped with the intelligent operating system and comprises a live broadcasting application module, a conditional access application module, a digital TV module, a media play module, a conditional access module, a trusted execution environment (TEE) and a high-security chip.

The digital TV module is configured to acquire a channel program list, to provide the acquired channel program list for the live broadcasting application module for display and to acquire all channel messages and a control management message. The channel messages comprise a channel program identifier and video stream identifier videoPid and audio stream identifier audioPid of all channels. The control management message comprises a conditional access application identifier casId, an entitlement control message identifier ecmPid and an entitlement management message identifier emmPid.

The live broadcasting application module is configured to send a switched channel program identifier to the media play module in response to a channel change instruction or a program play instruction of a user.

The media play module is configured to acquire a video stream identifier videoPid, an audio stream identifier audioPid, a conditional access application identifier casId, an entitlement control message identifier ecmPid and an entitlement management message identifier emmPid of a channel program from the digital TV module according to the acquired channel program identifier, to distribute a descrambler message DescramblerId required to be used by the channel program and to send the video stream identifier videoPid, the audio stream identifier audioPid, the conditional access application identifier casId, the entitlement control message identifier ecmPid, the entitlement management message identifier emmPid and the descrambler message DescramblerId of a channel to the conditional access module.

The conditional access module is configured to select a conditional access application module that is registered in the intelligent operating system and matched with the conditional access application identifier casId according to the received conditional access application identifier casId and to simultaneously send the video stream identifier videoPid, the audio stream identifier audioPid, the entitlement control message identifier ecmPid, the entitlement management message identifier emmPid and the descrambler message DescramblerId of the channel to the conditional access application module.

The conditional access application module is configured to acquire corresponding entitlement control message data ecm Data and entitlement management message data emm Data from the digital TV module according to the acquired entitlement control message identifier ecmPid and entitlement management message identifier emmPid and to send the acquired corresponding entitlement control message data ecm Data and entitlement management message data emm Data, as well as the video stream identifier videoPid, the audio stream identifier audioPid and the descrambler message DescramblerId of the channel, to the conditional access module.

The conditional access module is further configured to send the entitlement control message data ecm Data and the entitlement management message data emm Data, as well as the video stream identifier videoPid, the audio stream identifier audioPid and the descrambler message DescramblerId of the channel, to a trusted application module in the trusted execution environment.

The trusted execution environment comprises a trusted application module that is configured to perform an parse according to a preset mechanism to acquire a descrambled entitlement message in the entitlement management message. If the descrambled entitlement message represents entitlement permission, encryption level keys EK1 and EK2 and an encryption control word ECW are acquired and sent to the high-security chip together with the video stream identifier videoPid, the audio stream identifier audioPid and the descrambler message DescramblerId.

The high-security chip is configured to control a descrambler specified by the descrambler message DescramblerId to descramble scrambled channel program data according to the encryption level keys EK1 and EK2, the encryption control word ECW, the video stream identifier videoPid and the audio stream identifier audioPid, and to play video stream data and audio stream data that are descrambled according to the video stream identifier videoPid and the audio stream identifier audioPid.

Preferably, the channel program identifier comprises an original network identifier onid, a transmission stream identifier tsid and a service identifier sid of the channel.

Preferably, all the channel messages acquired by the digital TV module comprise an identifier CAMode that indicates whether all the channels are scrambled channels or not.

The media play module is further configured to inquire and acquire the identifier CAMode that indicates whether the channel is a scrambled channel or not from the digital TV module according to the channel program identifier and to judge whether the channel is the scrambled channel or not according to the identifier CAMode;

If it is judged that the channel is not the scrambled channel in the judgement step, the media play module acquires the video stream identifier videoPid and the audio stream identifier audioPid of the channel from the digital TV module and provides the acquired video stream identifier videoPid and audio stream identifier audioPid of the channel for the high-security chip for play.

If it is judged that the channel is the scrambled channel in the judgement step, the media play module acquires the video stream identifier videoPid, the audio stream identifier audioPid, the conditional access application identifier casId, the entitlement control message ecmPid and the entitlement management message identifier emmPid of the channel from the digital TV module.

Preferably, the digital TV module, the media play module and the conditional access module are component-layer components that are pre-disposed in the intelligent operating system.

Preferably, the digital TV module, the media play module and the conditional access module realize a client-service structure. An IPC calling mode is employed between a client and a service.

Preferably, the conditional access application module and the live broadcasting application module are applications that may be installed in or uninstalled from the intelligent operating system.

Preferably, a plurality of conditional access application modules is registered in the intelligent operating system and provided by different conditional access manufacturers.

Preferably, a plurality of trusted application modules is disposed in the trusted execution environment and provided by different conditional access manufacturers. The conditional access application module carries an identifier that indicates a trusted application matched module with the conditional access application module. A corresponding relationship between the conditional access application module and the trusted application module is established in the conditional access module when the conditional access application module is registered in the intelligent operating system, such that the conditional access module may send the entitlement control message data ecm Data and the entitlement management message data emm Data, as well as the video stream identifier videoPid, the audio stream identifier audioPid and the descrambler message DescramblerId of the channel, to the trusted application module matched with the conditional access application module.

Preferably, the trusted execution environment (TEE) comprises a hardware resource, a TEE internal API and a secure operating system that are isolated from the intelligent operating system.

The inventor of the present invention discovered that a conditional access system which adapts to conditional access applications of multiple manufacturers had not been proposed for an intelligent operating system, particularly for an intelligent TV operating system. Thus, a technical task to be achieved or a technical problem to be solved by the present invention is never thought or expected by those skilled in the art. Accordingly, the present invention is a new technical solution.

Other features and advantages of the present invention will become apparent from the following detailed description of exemplary embodiments of the present invention with reference to the accompanying drawings.

BRIEF DESCRIPTION OF THE DRAWINGS

The accompanying drawings, which are incorporated in and constitute a part of the description, illustrate embodiments of the present invention and, together with the description thereof, serve to explain the principles of the present invention.

DETAILED DESCRIPTION

Figure 1:
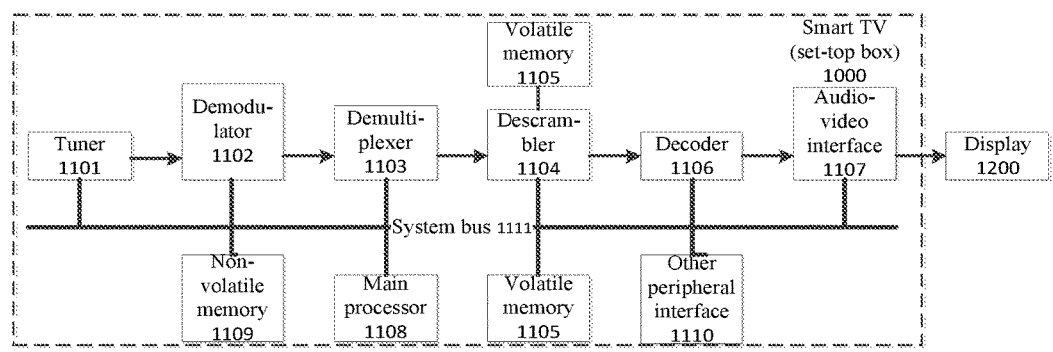
FIG. 1 illustrates a block diagram of hardware configuration of a smart TV 1000 according to an embodiment of the present invention.

Various exemplary embodiments of the present invention will now be described in detail with reference to the accompanying drawings. It should be noted that the relative arrangement, numerical expressions and numerical values of the components and steps set forth in these examples do not limit the scope of the invention unless otherwise specified.

The following description of at least one exemplary embodiment is in fact merely illustrative and is in no way intended as a limitation to the present invention and its application or use.

Techniques, methods, and apparatus known to those of ordinary skill in the relevant art may not be discussed in detail but where appropriate, the techniques, methods, and apparatus should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, and there is no need for further discussion in the subsequent accompanying drawings.

<Hardware Configuration>

FIG. 1 illustrates a block diagram of hardware configuration of a smart TV 1000 according to an embodiment of the present invention.

<Hardware Configuration>

FIG. 1 illustrates a block diagram of hardware configuration of a smart TV 1000 according to an embodiment of the present invention.

As shown in FIG. 1, the smart TV 1000 typically comprises a main processor 1108, a tuner 1101 configured to receive a TV signal, a demodulator 1102, a nonvolatile memory 1109, a demultiplexer 1103, a descrambler 1104, a volatile memory 1105, a decoder 1106, an audio-video interface 1107 and other peripheral interfaces 1110, which are connected through a system bus 1111. The TV and set-top box integrated smart TV further comprises a display 1200.

An intelligent operating system, an application program, other program modules and some program data reside in the nonvolatile memory 1109.

The smart TV shown in FIG. 1 is merely illustrative and by no means is to be construed as any limitation to the present invention and its application or use.

First Embodiment

Figure 2:
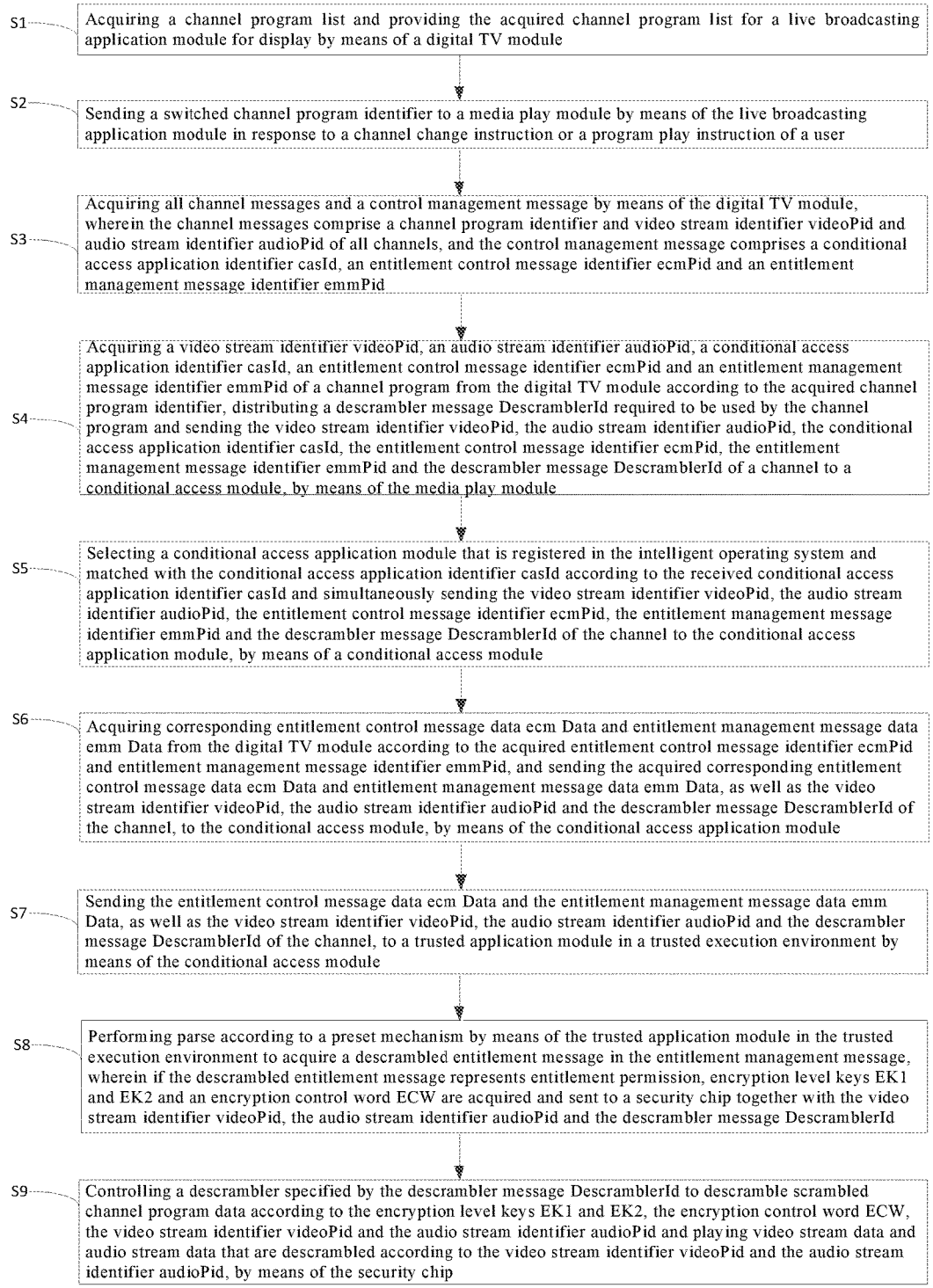
FIG. 2 illustrates a flow chart of a conditional access method for an intelligent operating system according to an embodiment of the present invention.
Figure 3:
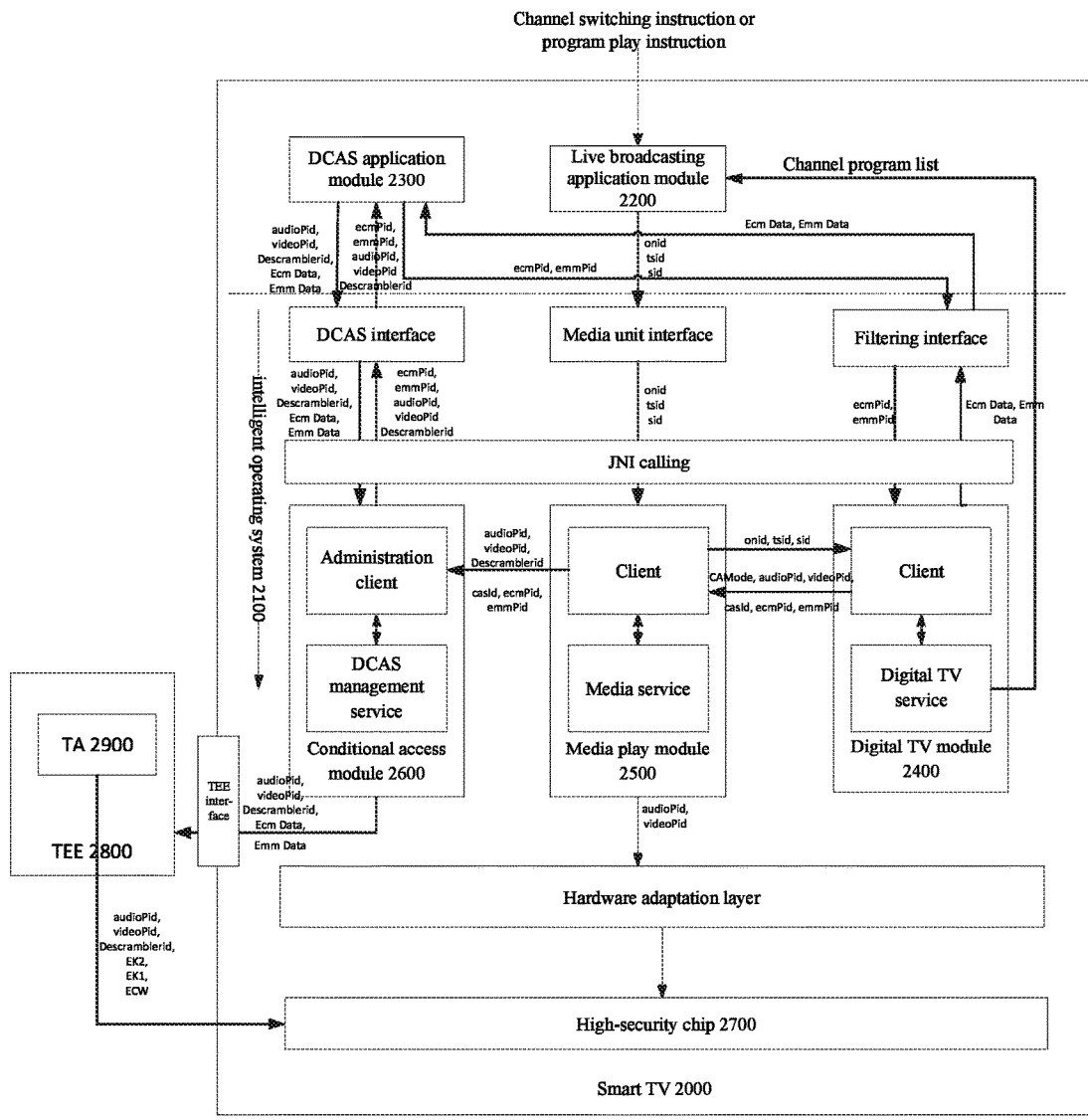
FIG. 3 illustrates a block diagram of a conditional access system for an intelligent operating system according to an embodiment of the present invention.

According to a first embodiment of the present invention, as shown in FIG. 2 and FIG. 3, there is provided a conditional access method for an intelligent operating system. The conditional access method is implemented in a smart device of the intelligent operating system 2100. The smart device may be a smart TV 2000 for example. The smart TV 2000 comprises a live broadcasting application module 2200, a conditional access application module 2300, a digital TV module 2400, a media play module 2500, a conditional access module 2600, a trusted execution environment 2800 and a high-security chip 2700.

The method according to the first embodiment of the present invention comprises the following steps. S1 includes acquiring a channel program list and providing the acquired channel program list for the live broadcasting application module 2200 for display by means of the digital TV module 2400. The channel program list is acquired by the digital TV module 2400 from a head-end server of a conditional access system after the smart TV is started up. The channel program list carries basic information that shows a user a channel program interface.

S2 includes sending a switched channel program identifier to the media play module 2500 by means of the live broadcasting application module 2200 in response to a channel change instruction or a program play instruction of the user. The channel program identifier comprises DVB element information of a channel. The DVB element information in the conditional access system is the only one identifier for determining a program. Element information in a DVB standard comprises an original network identifier onid, a transmission stream identifier tsid and a service identifier sid of the channel.

S3 includes acquiring all channel messages and a control management message by means of the digital TV module 2400. The channel messages comprise channel program identifier and video stream identifier videoPid and audio stream identifier audioPid of all channels. The control management message comprises a conditional access application identifier casId, an entitlement control message identifier ecmPid and an entitlement management message identifier emmPid. Similar to the channel program list, all the channel messages and the control management message are acquired by the digital TV module 2400 from the head-end server of the conditional access system after the smart TV is started up. The channel messages comprise the channel program identifier, particularly DVB element identifier and the video stream identifier videoPid and the audio stream identifier audioPid of all the channels. The control management message comprises the conditional access application identifier casId, the entitlement control message identifier ecmPid and the entitlement management message identifier emmPid.

S4 includes acquiring a video stream identifier videoPid, an audio stream identifier audioPid, a conditional access application identifier casId, an entitlement control message identifier ecmPid and an entitlement management message identifier emmPid of a channel program from the digital TV module 2400 according to the acquired channel program identifier, distributing a descrambler message DescramblerId required to be used by the channel program and sending the video stream identifier videoPid, the audio stream identifier audioPid, the conditional access application identifier casId, the entitlement control message identifier ecmPid, the entitlement management message identifier emmPid and the descrambler message DescramblerId of a channel to the conditional access module 2600, by means of the media play module 2500.

S5 includes selecting a conditional access application module 2300 that is registered in the intelligent operating system and matched with the conditional access application identifier casId according to the received conditional access application identifier casId and simultaneously sending the video stream identifier videoPid, the audio stream identifier audioPid, the entitlement control message identifier ecmPid, the entitlement management message identifier emmPid and the descrambler message DescramblerId of the channel to the conditional access application module 2300, by means of the conditional access module 2600.

Particularly, in a typical embodiment, a plurality of conditional access application modules 2300 may be registered in the intelligent operating system and provided by different conditional access manufacturers. The plurality of conditional access application modules is registered in the intelligent operating system through pre-installing or downloading and pre-installing. The different conditional access application modules may be switched according to a watching requirement of the user and may carry parse modes of entitlement control messages, entitlement management messages and encryption control words of the different conditional access manufactures. After a conditional access application module of a certain conditional access manufacturer is loaded, the whole intelligent operating system may completely adapt to a conditional access mechanism of the conditional access application module of the certain conditional access manufacturer from software to hardware and may be freely switched between the different conditional access manufacturers. Thus, beneficial effects of a conventional DCAS (Downloadable Conditional Access System) in the multi-manufacturer free switching and adapting aspects may be continuously supported on the intelligent operating system.

S6 includes acquiring corresponding entitlement control message data ecm Data and entitlement management message data emm Data from the digital TV module 2400 according to the acquired entitlement control message identifier ecmPid and entitlement management message identifier emmPid, and sending the acquired corresponding entitlement control message data ecm Data and entitlement management message data emm Data, as well as the video stream identifier videoPid, the audio stream identifier audioPid and the descrambler message DescramblerId of the channel, to the conditional access module 2600, by means of the conditional access application module 2300.

S7 includes sending the entitlement control message data ecm Data and the entitlement management message data emm Data, as well as the video stream identifier videoPid, the audio stream identifier audioPid and the descrambler message DescramblerId of the channel, to a trusted application module (TA) 2900 in the trusted execution environment 2800 by means of the conditional access module 2600.

S8 includes performing parse according to a preset mechanism by means of the trusted application module 2900 in the trusted execution environment 2800 to acquire a descrambled entitlement message in the entitlement management message. If the descrambled entitlement message represents entitlement permission, encryption level keys EK1 and EK2 and an encryption control word ECW are acquired and sent to the high-security chip 2700 together with the video stream identifier videoPid, the audio stream identifier audioPid and the descrambler message DescramblerId.

S9 includes controlling a descrambler (not shown) specified by the descrambler message DescramblerId to descramble scrambled channel program data according to the encryption level keys EK1 and EK2, the encryption control word ECW, the video stream identifier videoPid and the audio stream identifier audioPid, and playing video stream data and audio stream data that are descrambled according to the video stream identifier videoPid and the audio stream identifier audioPid, by means of the high-security chip 2700.

Preferably, the digital TV module 2400, the media play module 2500 and the conditional access module 2600 are component-layer components that are pre-disposed in the intelligent operating system. Thus, the smart TV enables its component layer to support its an application layer.

More preferably, the digital TV module 2400, the media play module 2500 and the conditional access module 2600 realize a client-service structure. An IPC calling mode is employed between a client and a service. Thus, individualization, grading, coordination and unified management of the digital TV module 2400, the media play module 2500 and the conditional access module 2600 may be realized respectively.

More preferably, the conditional access application module 2300 and the live broadcasting application module 2200 are applications that may be installed in or uninstalled from the intelligent operating system.

Particularly, in a typical embodiment, a plurality of trusted application modules 2900 may be disposed in the trusted execution environment 2800, are provided by different conditional access manufacturers, and may be pre-installed in the smart TV or securely downloaded in the trusted execution environment. Each conditional access application module carries an identifier that indicates the trusted application module 2900 matched with the conditional access application module. A corresponding relationship between the conditional access application module 2300 and the trusted application module 2900 is established in the conditional access module 2600 when the conditional access application module is registered in the intelligent operating system, such that the conditional access module 2600 may send the entitlement control message data ecm Data and the entitlement management message data emm Data, as well as the video stream identifier videoPid, the audio stream identifier audioPid and the descrambler message DescramblerId of the channel, to the trusted application module 2900 matched with the conditional access application module 2300. In this way, conditional access mechanisms of the different conditional access manufacturers may be securely executed in the trusted execution environment. The whole intelligent operating system may completely adapt to the conditional access mechanisms of the conditional access manufacturers from software to hardware and may be freely switched between the different conditional access manufacturers. Thus, beneficial effects of a conventional DCAS (Downloadable Conditional Access System) in the multi-manufacturer free switching and adapting aspects may be continuously supported on the intelligent operating system.

In order to guarantee the security of the intelligent operating system, particularly an intelligent TV operating system, and to simultaneously draw its openness into consideration, more preferably, a standard DCAS interface may be provided between the conditional access module 2600 and the conditional access application module 2300 to allow the conditional access application module 2300 to call corresponding functions of the conditional access module 2600. Similarly, a standard filtering interface may be provided between the digital TV module 2400 and the conditional access application module 2300. A standard media unit interface may be provided between the media play module 2500 and the live broadcasting application module 2200. Meanwhile, a standard TEE interface may be provided between the conditional access module 2600 and the trusted execution environment TEE 2800.

Furthermore, since the intelligent operating system, particularly the intelligent TV operating system, has the characteristics that an application layer is usually realized by Java language and the operating system is usually realized by C language, more preferably, JNI calling interfaces may be provided between the above-mentioned standard interfaces and the digital TV module 2400, the media play module 2500 and the conditional access modules 2600 for implementing Java-C communication and mapping.

Therefore, a method for implementing conditional access in the intelligent operating system is described on a conditional access scenario in accordance with the first embodiment of the present invention. In the embodiment, by taking the intelligent operating system as an overall framework, the method for implementing conditional access in the intelligent operating system is provided. Not only is conditional access suitable for realizing the intelligent operating system provided, but also beneficial effects of a conventional conditional access system in the multi-manufacturer free switching and adapting aspects may be continuously maintained in the intelligent operating system. Meanwhile, as parse of the entitlement control message data ecm Data and the entitlement management message data emm Data is performed in the trusted execution environment, the system security is further improved.

Second Embodiment

The first embodiment of the present invention has been described above with reference to the drawings. The followings will describe a second embodiment of the present invention. The portions not described below are the same as those of the first embodiment, and therefore, will not be repeated. According to the embodiment, there is provided a conditional access method which freely adapts to a conditional access scenario and an unconditional access scenario. Generally, TV programs include scrambled programs (conditional access programs) and non-scrambled programs. Under the condition of non-scrambled programs, a play device may directly acquire video stream data and audio stream data of the corresponding programs. Under the condition of scrambled programs, conditional access is involved, and only the qualified user may acquire a control word (CW) that is necessary for descrambling, and then descrambling is performed so that the user can watch the programs. When programs provided by a head end include not only scrambled programs but also non-scrambled programs, according to the method provided by the second embodiment of the present invention, channel messages acquired in step S3 of acquiring all the channel messages and a control management message by means of the digital TV module may comprise an identifier CAMode that indicates whether all channels are scrambled channels or not.

Therefore, in step S4, the media play module 2400 inquires and acquires the identifier CAMode that indicates whether a channel is a scrambled channel or not from the digital TV module 2400 according to the channel program identifier and judges whether the channel is the scrambled channel or not according to the identifier CAMode.

If it is judged that the channel is not the scrambled channel in the judgement step, the media play module 2500 acquires the video stream identifier videoPid and the audio stream identifier audioPid of the channel from the digital TV module 2400 and provides the acquired video stream identifier videoPid and audio stream identifier audioPid of the channel for the high-security chip 2700 for play.

If it is judged that the channel is the scrambled channel in the judgement step, the media play module 2500 acquires the video stream identifier videoPid, the audio stream identifier audioPid, the conditional access application identifier casId, the entitlement control message ecmPid and the entitlement management message identifier emmPid of the channel from the digital TV module 2400.

The method for realizing play in the intelligent operating system under the conditional access and unconditional access scenarios is described in accordance with the second embodiment of the present invention. The method of this embodiment may freely adapt to the conditional access and unconditional access scenarios. Thus, the compatibility and the usability of the system are further improved.

Those skilled in the art should understand that the candidate set calculating device and the text correcting device can be implemented in various ways. For example, the candidate set calculation device and the text error correction device may be implemented by an instruction configuration processor. For example, instructions may be stored in ROM, and when the device is booted, instructions are read from the ROM into a programmable device to implement a candidate set computing device and a text error correction device. For example, the candidate set computing device and the text error correcting device can be solidified into a dedicated device (eg, an ASIC). The candidate set computing device and the text error correcting device may be divided into independent units or they may be implemented together. The candidate set computing device and the text error correcting device may be implemented by one of the above-mentioned various implementations, or may be implemented by a combination of two or more of the aforementioned various implementations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled in the art that the implementations of using hardware, using software or using the combination of software and hardware can be equivalent with each other.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The scope of the present invention is defined by the attached claims.

What is claimed is:

1. A conditional access method for an intelligent operating system, wherein the method is implemented in a smart device that is equipped with the intelligent operating system and comprises a live broadcasting application module, a conditional access application module, a digital TV module, a media play module, a conditional access module, a trusted execution environment (TEE) and a security chip, and comprising:

acquiring a channel program list and providing the acquired channel program list for the live broadcasting application module for display by means of the digital TV module;

sending a switched channel program identifier to the media play module by means of the live broadcasting application module in response to a channel change instruction or a program play instruction of a user;

acquiring all channel messages and a control management message by means of the digital TV module, wherein the channel messages comprise a channel program identifier and video stream identifier videoPid and audio stream identifier audioPid of all channels, and the control management message comprises a conditional access application identifier casId, an entitlement control message identifier ecmPid and an entitlement management message identifier emmPid;

acquiring a video stream identifier videoPid, an audio stream identifier audioPid, a conditional access application identifier casId, an entitlement control message identifier ecmPid and an entitlement management message identifier emmPid of a channel program from the digital TV module according to the acquired channel program identifier, distributing a descrambler message DescramblerId required to be used by the channel program and sending the video stream identifier videoPid, the audio stream identifier audioPid, the conditional access application identifier casId, the entitlement control message identifier ecmPid, the entitlement management message identifier emmPid and the descrambler message DescramblerId of the channel to the conditional access module, by means of the media play module;

selecting a conditional access application module that is registered in the intelligent operating system and matched with the conditional access application identifier casId according to the received conditional access application identifier casId and simultaneously sending the video stream identifier videoPid, the audio stream identifier audioPid, the entitlement control message identifier ecmPid, the entitlement management message identifier emmPid and the descrambler message DescramblerId of the channel to the conditional access application module, by means of the conditional access module;

acquiring corresponding entitlement control message data ecm Data and entitlement management message data emm Data from the digital TV module according to the acquired entitlement control message identifier ecmPid and entitlement management message identifier emmPid, and sending the acquired corresponding entitlement control message data ecm Data and entitlement management message data emm Data, as well as the video stream identifier videoPid, the audio stream identifier audioPid and the descrambler message DescramblerId of the channel, to the conditional access module, by means of the conditional access application module;

sending the entitlement control message data ecm Data and the entitlement management message data emm Data, as well as the video stream identifier videoPid, the audio stream identifier audioPid and the descrambler message DescramblerId of the channel, to a trusted application module in the trusted execution environment by means of the conditional access module;

performing parse according to a preset mechanism by means of the trusted application module in the trusted execution environment to acquire a descrambled entitlement message in the entitlement management message, wherein if the descrambled entitlement message represents entitlement permission, encryption level keys EK1 and EK2 and an encryption control word ECW are acquired and sent to the security chip together with the video stream identifier videoPid, the audio stream identifier audioPid and the descrambler message DescramblerId; and controlling a descrambler specified by the descrambler message DescramblerId to descramble scrambled channel program data according to the encryption level keys EK1 and EK2, the encryption control word ECW, the video stream identifier videoPid and the audio stream identifier audioPid and playing video stream data and audio stream data that are descrambled according to the video stream identifier videoPid and the audio stream identifier audioPid, by means of the security chip.

2. The conditional access method according to claim 1, wherein the channel program identifier comprises an original network identifier onid, a transmission stream identifier tsid and a service identifier sid of the channel.

3. The conditional access method according to claim 1, wherein the channel messages acquired in the step of acquiring all the channel messages and the control management message by means of the digital TV module comprise an identifier CAMode that indicates whether all the channels are scrambled channels or not; and after the step of acquiring all the channel messages and the control management message by means of the digital TV module, the conditional access method further comprises:

inquiring and acquiring the identifier CAMode that indicates whether the channel is a scrambled channel or not from the digital TV module according to the channel program identifier and judging whether the channel is the scrambled channel or not according to the identifier CAMode by means of the media play module;

if judging that the channel is not the scrambled channel in the judgement step, acquiring the video stream identifier videoPid and the audio stream identifier audioPid of the channel from the digital TV module by means of the media play module, and entering the play step; and if judging that the channel is the scrambled channel in the judgement step, acquiring the video stream identifier videoPid, the audio stream identifier audioPid, the conditional access application identifier casId, the entitlement control message ecmPid and the entitlement management message identifier emmPid of the channel from the digital TV module by means of the media play module.

4. The conditional access method according to claim 1, wherein the digital TV module, the media play module and the conditional access module are component-layer components pre-disposed in the intelligent operating system.

5. The conditional access method according to claim 1, wherein the digital TV module, the media play module and the conditional access module realize a client-service structure, and an IPC calling mode is employed between a client and a service.

6. The conditional access method according to claim 1, wherein the conditional access application module and the live broadcasting application module are applications that may be installed in or uninstalled from the intelligent operating system.

7. The conditional access method according to claim 1, wherein a plurality of conditional access application modules is registered in the intelligent operating system and provided by different conditional access manufacturers, and the different conditional access application modules may be switched according to a watching requirement of the user.

8. The conditional access method according to claim 1, wherein a plurality of trusted application modules is disposed in the trusted execution environment and provided by different conditional access manufacturers, the conditional access application module carries an identifier that indicates a trusted application module matched with the conditional access application module, and a corresponding relationship between the conditional access application module and the trusted application module is established in the conditional access module when the conditional access application module is registered in the intelligent operating system, such that the conditional access module may send the entitlement control message data ecm Data and the entitlement management message data emm Data, as well as the video stream identifier videoPid, the audio stream identifier audioPid and the descrambler message DescramblerId of the channel, to the trusted application module matched with the conditional access application module.

9. The conditional access method according to claim 1, wherein the trusted execution environment (TEE) comprises a hardware resource, a TEE internal API and a secure operating system that are isolated from the intelligent operating system.

10. A conditional access system for an intelligent operating system, disposed in a smart device that is equipped with the intelligent operating system and comprises a live broadcasting application module, a conditional access application module, a digital TV module, a media play module, a conditional access module, a trusted execution environment (TEE) and a security chip, wherein the digital TV module is configured to acquire a channel program list, to provide the acquired channel program list for the live broadcasting application module for display and to acquire all channel messages and a control management message, wherein the channel messages comprise a channel program identifier and video stream identifier videoPid and audio stream identifier audioPid of all channels, and the control management message comprises a conditional access application identifier casId, an entitlement control message identifier ecmPid and an entitlement management message identifier emmPid;

the live broadcasting application module is configured to send a switched channel program identifier to the media play module in response to a channel change instruction or a program play instruction of a user;

the media play module is configured to acquire a video stream identifier videoPid, an audio stream identifier audioPid, a conditional access application identifier casId, an entitlement control message identifier ecmPid and an entitlement management message identifier emmPid of a channel program from the digital TV module according to the acquired channel program identifier, to distribute a descrambler message DescramblerId required to be used by the channel program and to send the video stream identifier videoPid, the audio stream identifier audioPid, the conditional access application identifier casId, the entitlement control message identifier ecmPid, the entitlement management message identifier emmPid and the descrambler message DescramblerId of a channel to the conditional access module;

the conditional access module is configured to select a conditional access application module that is registered in the intelligent operating system and matched with the conditional access application identifier casId according to the received conditional access application identifier casId and to simultaneously send the video stream identifier videoPid, the audio stream identifier audioPid, the entitlement control message identifier ecmPid and the entitlement management message identifier emmPid and the descrambler message DescramblerId of the channel to the conditional access application module;

the conditional access application module is configured to acquire corresponding entitlement control message data ecm Data and entitlement management message data emm Data from the digital TV module according to the acquired entitlement control message identifier ecmPid and entitlement management message identifier emmPid and to send the acquired corresponding entitlement control message data ecm Data and entitlement management message data emm Data, as well as the video stream identifier videoPid, the audio stream identifier audioPid and the descrambler message DescramblerId of the channel, to the conditional access module;

the conditional access module is further configured to send the entitlement control message data ecm Data and the entitlement management message data emm Data, as well as the video stream identifier videoPid, the audio stream identifier audioPid and the descrambler message DescramblerId of the channel, to a trusted application module in the trusted execution environment;

the trusted execution environment comprises a trusted application module that is configured to perform an parse according to a preset mechanism to acquire a descrambled entitlement message in the entitlement management message, wherein if the descrambled entitlement message represents entitlement permission, encryption level keys EK1 and EK2 and an encryption control word ECW are acquired and sent to the security chip together with the video stream identifier videoPid, the audio stream identifier audioPid and the descrambler message DescramblerId; and the security chip is configured to control a descrambler specified by the descrambler message DescramblerId to descramble scrambled channel program data according to the encryption level keys EK1 and EK2, the encryption control word ECW, the video stream identifier videoPid and the audio stream identifier audioPid, and to play video stream data and audio stream data that are descrambled according to the video stream identifier videoPid and the audio stream identifier audioPid.

11. The conditional access system according to claim 10, wherein the channel program identifier comprises an original network identifier onid, a transmission stream identifier tsid and a service identifier sid of the channel.

12. The conditional access system according to claim 10, wherein all the channel messages acquired by the digital TV module comprise an identifier CAMode that indicates whether all the channels are scrambled channels or not;

the media play module is further configured to inquire and acquire the identifier CAMode that indicates whether the channel is a scrambled channel or not from the digital TV module according to the channel program identifier and to judge whether the channel is the scrambled channel or not according to the identifier CAMode;

if it is judged that the channel is not the scrambled channel in the judgement step, the media play module acquires the video stream identifier videoPid and the audio stream identifier audioPid of the channel from the digital TV module and provides the acquired video stream identifier videoPid and audio stream identifier audioPid of the channel for the security chip for play; and if it is judged that the channel is the scrambled channel in the judgement step, the media play module acquires the video stream identifier videoPid, the audio stream identifier audioPid, the conditional access application identifier casId, the entitlement control message ecmPid and the entitlement management message identifier emmPid of the channel from the digital TV module.

13. The conditional access system according to claim 10, wherein the digital TV module, the media play module and the conditional access module are component-layer components that are pre-disposed in the intelligent operating system.

14. The conditional access system according to claim 10, wherein the digital TV module, the media play module and the conditional access module realize a client-service structure, and an IPC calling mode is employed between a client and a service.

15. The conditional access system according to claim 10, wherein the conditional access application module and the live broadcasting application module are applications that may be installed in or uninstalled from the intelligent operating system.

16. The conditional access system according to claim 10, wherein a plurality of conditional access application modules is registered in the intelligent operating system and provided by different conditional access manufacturers.

17. The conditional access system according to claim 10, wherein a plurality of trusted application modules is disposed in the trusted execution environment and provided by different conditional access manufacturers, the conditional access application module carries an identifier that indicates a trusted application module matched with the conditional access application module, and a corresponding relationship between the conditional access application module and the trusted application module is established in the conditional access module when the conditional access application module is registered in the intelligent operating system, such that the conditional access module may send the entitlement control message data ecm Data and the entitlement management message data emm Data, as well as the video stream identifier videoPid, the audio stream identifier audioPid and the descrambler message DescramblerId of the channel, to the trusted application module matched with the conditional access application module.

18. The conditional access system according to claim 10, wherein the trusted execution environment (TEE) comprises a hardware resource, a TEE internal API and a secure operating system that are isolated from the intelligent operating system.

* * * * *